(12) United States Patent
Günther et al.

(10) Patent No.: US 8,405,822 B2
(45) Date of Patent: Mar. 26, 2013

(54) OPTICAL STRAIN GAUGE COMPRISING A FIBER BRAGG GRATING

(75) Inventors: Bernd Günther, Karlsruhe (DE); Hagen Ruppin, Nauheim (DE); Karl-Heinz Haase, Pfungstadt (DE); Tobias Kipp, Rödermark (DE); Manfred Kreuzer, Weiterstadt (DE); Jochen Maul, Mainz (DE); Rudolf Schulz, Weiterstadt (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 13/265,974

(22) PCT Filed: Apr. 22, 2010

(86) PCT No.: PCT/DE2010/000460
§ 371 (c)(1),
(2), (4) Date: May 17, 2012

(87) PCT Pub. No.: WO2010/121605
PCT Pub. Date: Oct. 28, 2010

(65) Prior Publication Data
US 2012/0262702 A1    Oct. 18, 2012

(30) Foreign Application Priority Data
Apr. 22, 2009  (DE) .......................... 10 2009 018 206

(51) Int. Cl.
*G01B 11/16*  (2006.01)
*G02B 6/00*  (2006.01)

(52) U.S. Cl. ............................ 356/32; 356/73.1; 385/13
(58) Field of Classification Search ........................ None
See application file for complete search history.

(56) References Cited

U.S. PATENT DOCUMENTS

| 4,761,073 | A   |   | 8/1988  | Meltz et al. |
|-----------|-----|---|---------|--------------|
| 5,818,982 | A   | * | 10/1998 | Voss et al. ........................ 385/13 |
| 6,233,374 | B1  | * | 5/2001  | Ogle et al. ....................... 385/13 |
| 6,361,299 | B1  | * | 3/2002  | Quigley et al. ............... 428/35.9 |
| 6,449,293 | B1  | * | 9/2002  | Pedersen et al. ................ 385/13 |
| 6,706,348 | B2  | * | 3/2004  | Quigley et al. ............... 428/36.3 |
| 6,720,553 | B2  |   | 4/2004  | Bonnell et al. |

(Continued)

FOREIGN PATENT DOCUMENTS

| DE | 39 02 997 C1 | 4/1990 |
| DE | 297 11 958 U1 | 10/1997 |

(Continued)

*Primary Examiner* — Gregory J Toatley
*Assistant Examiner* — Juan D Valentin, II
(74) *Attorney, Agent, or Firm* — Henry M Feiereisen LLC

(57) ABSTRACT

The invention relates to an optical strain gauge using a glass fiber (1) comprising a Bragg grating (2). The glass fiber is coated with a sheath (3) of polyether ether ketone with an admixture of at least 10 weight percent and a maximum of 40 weight percent of an inorganic filler, with a particle size of between 0.08 μm and 12 μm. The outer diameter of the sheath (3) is between 0.2 mm and 1.2 mm. The ratio D/d between the outer diameter D of the sheath (3) and the diameter d of the glass fiber (1) is between 2 and 6. A pressure of the sheath (3) on the glass fiber (1) is such that essentially no relative movement can occur between the glass fiber (1) and the sheath (3).

15 Claims, 2 Drawing Sheets

U.S. PATENT DOCUMENTS

| | | |
|---|---|---|
| 2001/0026362 A1 | 10/2001 | Gleine et al. |
| 2003/0066356 A1 | 4/2003 | Kanellopoulos et al. |
| 2006/0159407 A1 | 7/2006 | Kachmar |
| 2006/0200049 A1 | 9/2006 | Leo et al. |
| 2007/0196059 A1* | 8/2007 | Kojima ........................ 385/100 |
| 2007/0276212 A1* | 11/2007 | Fuimaono et al. ............ 600/374 |
| 2009/0287092 A1* | 11/2009 | Leo et al. ........................ 385/12 |

FOREIGN PATENT DOCUMENTS

| | | |
|---|---|---|
| DE | 100 04 384 C2 | 8/2001 |
| DE | 100 31 412 C2 | 10/2001 |
| DE | 10 2007 008 464 A1 | 8/2008 |

* cited by examiner

OPTICAL STRAIN GAUGE COMPRISING A FIBER BRAGG GRATING

The invention relates to an optical strain gauge using a glass fiber with a Bragg grating as strain sensor. Utilizing the variation of optical properties of materials for measuring material strains is sufficiently known from prior art, especially as the theory is concerned. An arrangement of this kind is shown in DE 100 04 384 C2, for example.

Strain gauges of such kind are composed of at least a sensor, which comprises a glass fiber with at least a fiber Bragg grating, and a signal line also comprising a glass fiber.

Glass fiber-type strain sensors are designed so as to detect the strain to be measured as accurately as possible. On principle, there are two groups of such sensors. With the sensors of the first group, the glass fiber used for performing measurements is arranged in a sturdy housing. The housing is fixed to the measuring point by bolting, for example, such as described in the documents DE 100 31 412 C2, DE 39 02 997 C1, U.S. Pat. No. 4,761,073 or DE 297 11 958 U1. The advantage of such embodiments is that the sensors arranged in a housing can be handled well and be fixed easily to the object to be measured, as well. Before or after fixing of the housing to the object to be measured, the strain-measuring fiber arranged in it is connected to a glass fiber-type signal line by any of the connecting means known from prior art, such as a connector assembly. However, sensors of this kind and the inherent signal lines having connectors are bulky and, therefore, can be used on measuring points only where there is enough space for fixing them.

Another problem of attaching such strain gauges is that the fiber Bragg grating must be placed at a predetermined point of measurement. Therefore, it is necessary to know exactly where the fiber Bragg grating is positioned. With sensors arranged in an housing, as described above, there is a geometrical interrelation between the outside edges of the housing and the position of the fiber Bragg grating. Therefore, there are no problems as to positioning and aligning of the sensor above the point of measurement.

However, there are numerous measurement tasks which require strains to be measured at points spatially accessible only under difficult conditions. In such cases, it is not possible to use sensors accommodated in bulky housings. With such cases of application, sensors embedded in flexible foils, for example, are used, as described in the document DE 10 2007 008 464 A1 or U.S. Pat. No. 6,720,553 B2. Sensors of such kind have a smaller volume and, therefore, can be fixed to points at which fixing of sensors arranged in sturdy voluminous housing is impossible. Under narrow spatial conditions, it is also difficult to fix sensors of such kind because the necessary handling actions can not be performed optimally. A big problem is to align the fiber Bragg grating at the point of measurement, because, under spatially limited conditions, it is possibly difficult to recognize markings and positioning marks applied on the foils.

In addition to spatial limitations at the point of measurement, difficult conditions by aggressive environmental effects may occur so that the sensors and the signal lines must be protected reliably. Especially, the connecting point between the sensor and the signal line must well be protected, which requires an additional expenditure.

Therefore, one object of the invention is to provide a measurement technique which enables a strain measurement to be performed even with spatial limitations and with a low expenditure. Especially, the strain sensor shall easily be fixable and the fiber Bragg graining shall precisely be assigned to the point of measurement. In addition, the signal line and the strain sensor shall be mechanically sturdy and, to a great extent, insensitive to water and aggressive substances. Another object of the invention is to provide a method of making such a measurement technique.

These objects are solved by an optical strain gauge according to claim 1 and by a method according to claim 10.

According to claim 1, the optical strain gauge comprises a glass fiber, which is provided with a Bragg grating, and a sheath, wherein the sheath has the following composition: a mixture of poly-ether ether ketone and an inorganic filler in an admixture of at least 10 percent by weight and maximum 40 percent by weight, with a particle size of 0.08 µm to 12 µm. The outside diameter of the sheath is 0.2 mm to 1.2 mm. The ratio D/d between the outside diameter D of the sheath and the diameter d of the glass fiber is 2 to 6. Pressure of the sheath on the glass fiber is such that essentially no relative movement can occur between the glass fiber and the sheath. The pressure of the sheath causes particles of the filler to bite into the glass fiber so that the effect mentioned above is gained.

The optical strain gauge according the invention is capable of meeting several requirements. The advantage of the optical strain gauge according to the invention is that the unit composed of a sensor and a signal line forms a very sturdy optical strain gauge which enables the fiber Bragg grating to be assigned precisely to the point of measurement, also under spatially limited conditions. The geometry as claimed, combined with the composition of the coating as claimed, allow the fiber Bragg grating to be localized exactly by means of a mechanically strong tool such as a screw driver, for example. For that purpose, the tool is moved along the sheath with a predetermined pressure applied to it. In doing so, the material of the sheath and, thus, the fiber Bragg graining as well are slightly deformed. The change of optical properties of the fiber Bragg grating, which is caused by the deformation, is detected by means of an evaluation technique. This enables the fiber Bragg grating to be localized precisely in the longitudinal direction of the optical strain gauge according to the invention so that the strain gauge will supply precise measuring results, also under narrow spatial conditions.

In addition to the property that the fiber Bragg grating can be localized simply and precisely, the optical strain gauge according to the invention has also those properties expected from an optical signal line. Of these, a sufficient plasticity and sturdiness must be emphasized, which enable sections of the signal line to be preformed manually so that they can be run and fixed on the measuring point by using an adhesive or by any other means, under spatially limited conditions. If the optical strain gauge according to the invention were highly elastic, it would not be possible to pre-form it. Therefore, it would hardly be possible to fix a predetermined section of the elastic fiber by means of an adhesive without using additional auxiliary means. However, such auxiliary means can not be used under spatially limited conditions. If the optical strain gauge according to the invention were very rigid, there would be no possibility to deform it, or on the other hand, it would kink so that the glass fiber breaks.

Furthermore, the material chosen for the sheath is highly resistant to numerous chemicals so that the optical strain gauge according to the invention can even be used in a harsh industrial environment without making expensive preventive measures necessary.

Another advantage of the optical strain gauge according to the invention is that any fracture of the glass fiber can be recognized by naked eye at a distance of at least 2 meters to it, depending on the brightness of the environment. For this purpose, a laser light source is connected to one end of the fiber. In case of a fracture of fiber, light will emerge from the site of fracture and, effected by the special composition of the transparent material, will be scattered so that it can be detected easily. Especially in cases where numerous measuring lines are used, this advantage is of interest, because such a defect can be detected quickly.

According to claim 2, the pressure of the sheath on the glass fiber is at least 120 N/mm². With such a pressure, essentially no relative movement between the glass fiber and the sheath can occur and, therefore, it is possible to measure a strain precisely.

According to claim 3, the glass fiber comprises a glass core with a coating of ORMOCER□. The coating of ORMOCER□ has a chemical stability sufficient for applying the sheath onto the glass fiber by extrusion in the process of making the optical strain gauge. This is not the case when typical coatings such as those made of acrylate or polyimide are used.

According to claims 4, the inorganic filler is a silicate; according to claim 5, the inorganic filler is a laminated silicate and, according to claim 6, the inorganic filler is talcum, chalk, calcium carbonate, barium sulfate, boron nitride, silicon dioxide or bentonite. These filler materials can enable the properties of the optical strain gauge according to the invention, as mentioned above, to be gained.

According to claim 7, the admixture of the inorganic filler is at least 25 percent by weight and maximum 40 percent by weight. This enables the plastic properties to be further improved.

According to claim 8, the admixture of the inorganic filler is at least 27 percent by weight and maximum 33 percent by weight. This enables the plastic properties to be improved still further.

According to claim 9, the particle size is at least 0.1 μm and maximum 10 μm. These particle sizes enable a good bonding between the sheath and the glass fiber to be gained.

According to claim 10, the method of making an optical strain gauge comprises the following steps: providing of a glass fiber having a Bragg grating and extruding of a sheath onto the glass fiber. The sheath comprises the following composition: a mixture of poly-ether ether ketone and an inorganic filler in an admixture of at least 10 percent by weight and maximum 40 percent by weight, with a particle size of at least 0.08 μm to 12 μm. The outside diameter of the sheath is 0.2 mm to 1.2 mm. The ratio D/d between the outside diameter D of the sheath and the diameter d of the glass fiber is 2 to 6. After termination of the process, a pressure of the sheath on the glass fiber is such that essentially no relative movement between the glass fiber and the sheath can occur. The pressure of the sheath on the glass fiber causes particles of the filler to bite into the glass fiber so that the effect mentioned above is gained.

An optical strain gauge made in accordance with the method according to the invention has those advantageous properties described above in detail.

According to claim 11, parameters of extruding are chosen so that, after termination of the process, the pressure of the sheath on the glass fiber is at least 120 N/mm². With such a pressure, essentially no relative movement can occur between the glass fiber and the sheath, and it is possible to measure a strain precisely.

According to claim 12, the step of providing a glass fiber comprises the step of providing a glass core and the step of applying a coating of ORMOCER□ onto the glass core. The coating of ORMOCER□ has a chemical stability sufficient for the process of extruding the sheath onto the glass fiber in the process of making the optical strain gauge. This is not the case when typical coatings such as those made of acrylate or polyimide are used.

According to claims 13, the inorganic filler is a silicate; according to claim 14, the inorganic filler is a laminated silicate and, according to claim 15, the inorganic filler is talcum, chalk, calcium carbonate, barium sulfate, boron nitride, silicon dioxide or bentonite. These filler materials can enable the properties of the optical strain gauge according to the invention, as wanted and mentioned above, to be gained.

Below, the invention will be explained in detail by means of an exemplified embodiment in connection with schematic drawings.

Figure 1:
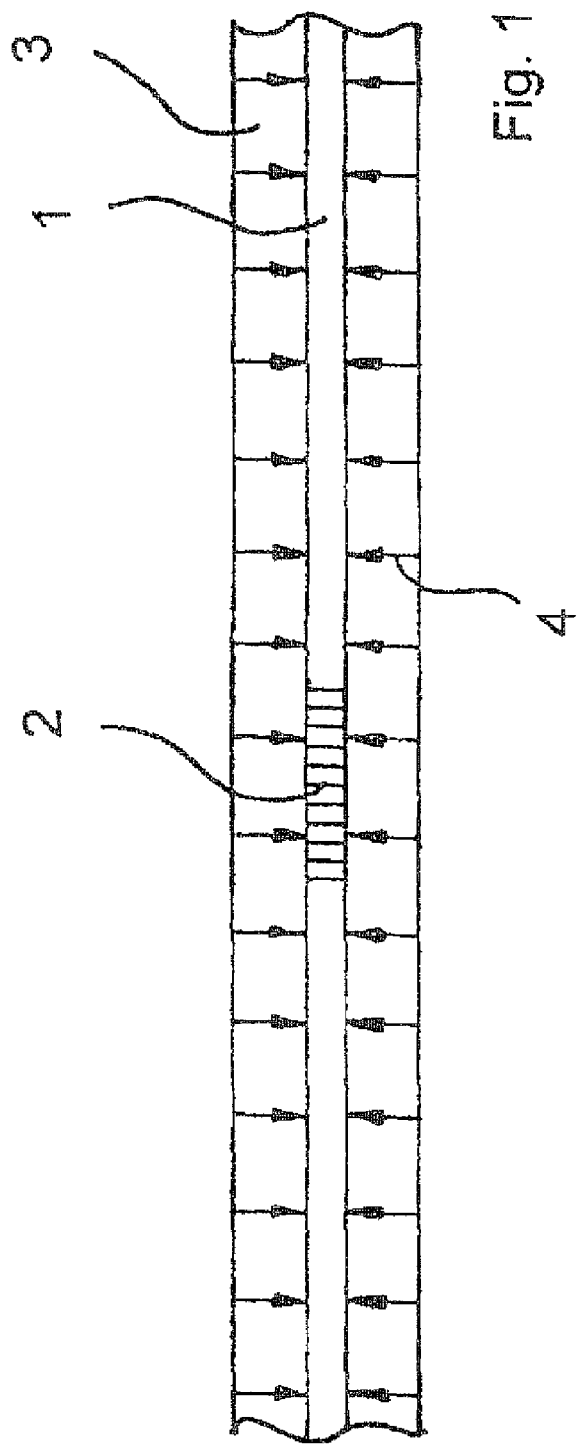
FIG. 1 is a longitudinal cross section of the optical strain gauge according to the exemplified embodiment, in a magnified scale.

FIG. 1 is a longitudinal cross section of an optical strain gauge according to the exemplified embodiment, in a magnified scale. Reference mark 1 denotes a glass fiber, reference mark 2 denotes a Bragg grating and reference mark 3 denotes a sheath. Reference mark 4 denotes arrows symbolizing a pressure of the sheath 3 on the glass fiber 1.

Figure 2:
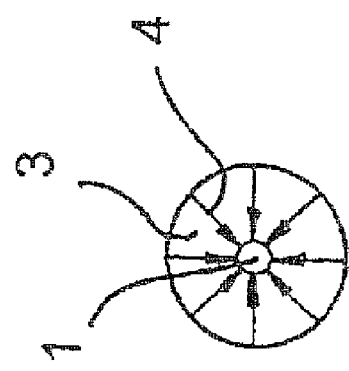
FIG. 2 is a cross-sectional view of the optical strain gauge according to the exemplified embodiment, in a magnified scale.

FIG. 2 is a cross-sectional view of the optical strain gauge according to the exemplified embodiment, in a magnified scale. The glass fiber 1 is co-axially arranged in the sheath 3.

The sheath 3 can comprise the following composition: a mixture of poly-ether ether ketone and an inorganic filler in an admixture of at least 10 percent by weight and maximum of 40 percent by weight, with a particle size of 0.08 μm to 12 μm, for example. Hereinafter, the poly-ether ether ketone is called PEEK, whilst the mixture of PEEK and the inorganic filler is called PEEKF.

The inorganic filler can be talcum (magnesium silicate hydrate, $Mg_3Si_4O_{10}(OH)_2$), chalk, calcium carbonate ($CaCO_3$), barium sulfate ($BaSO_4$), boron nitride (BN), silicon dioxide ($SiO_2$), bentonite (main component (60-80%) is montmorillonite (laminated aluminum silicate, $Al_2\{(OH)_2/Si_4O_{10}\}nH_2O$))), quartz, ($SiO_2$), aluminum oxide ($Al_2O_3$), silicon carbide (SiC), hollow glass spherules, precipitated silicic acid, zinc sulfide (ZnS) or titanium oxide ($TiO_2$), for example.

The glass fiber 1 can comprise a glass core 5 having a Bragg grating 2 and a coating 6. The coating 6 can be ORMOCER□, for example, an inorganic-organic hybrid polymer.

The outside diameter D of the sheath 3 can be 0.2 mm to 1.2 mm. The ratio D/d between the outside diameter D of the sheath 3 and the diameter d of the glass fiber 1 can be 2 to 6, for example. As the exemplified embodiment is concerned, the diameter d of the glass fiber 1 is 0.185 mm and the outside diameter D of the sheath 3 is 0.6 mm. The sheath 3 is made of PEEKF with talcum as filler in an admixture of 30 percent by weight, with a particle size of 0.1 μm to 10 μm. The sheath 3 was applied onto the glass fiber 1 by means of an extrusion process and encloses the glass fiber 1 with a predetermined pressure of more than 0. The concentric pressure distribution is marked by arrows 4.

The pressure of the sheath 3 on the glass fiber 1 can be such that essentially no relative movement between the glass fiber 1 and the sheath 3 can occurs, and it is possible to measure a strain precisely. The pressure of the sheath 3 on the glass fiber 1 can be between 120 N/mm² and 216 N/mm², for example.

On making the optical strain gauge 1, the sheath 3, which the inorganic filler is distributed in, is applied onto the glass fiber 1 by an extrusion process. Extrusion is performed at a high temperature, because the melting point of PEEKF is more than 370° C. During a slow cooling-down process and from a temperature limit on, at which the PEEKF begins to solidify, a certain pressure per degree of cooling is generated, due to the different material expansions of the glass fiber 1 and the sheath 3. For example, the expansion coefficient of glass can be 0.5 ppm/K and that of PEEKF can be 25 ppm/K, from which a delta of 24.5 ppm/K results. The temperature limit, at which the PEEKF begins to solidify, can be about 170° C., for example. When the strain gauge is cooled from about 170° C. down to about 20° C., the calculation is 150 K×24.5 ppm/K, for example.

Thus, due to the different expansions of the materials which the glass fiber 1 and the sheath 3 are made of, shrinking occurs, with the result that a shrinkage join between the sheath 3 and the glass fiber 1 is formed. Thereby, the sheath 3 is tightly wedged to the glass fiber 1. This is effected by specific parameters of the extrusion process and a specific composition of PEEFK which the sheath is made of.

Figure 3:
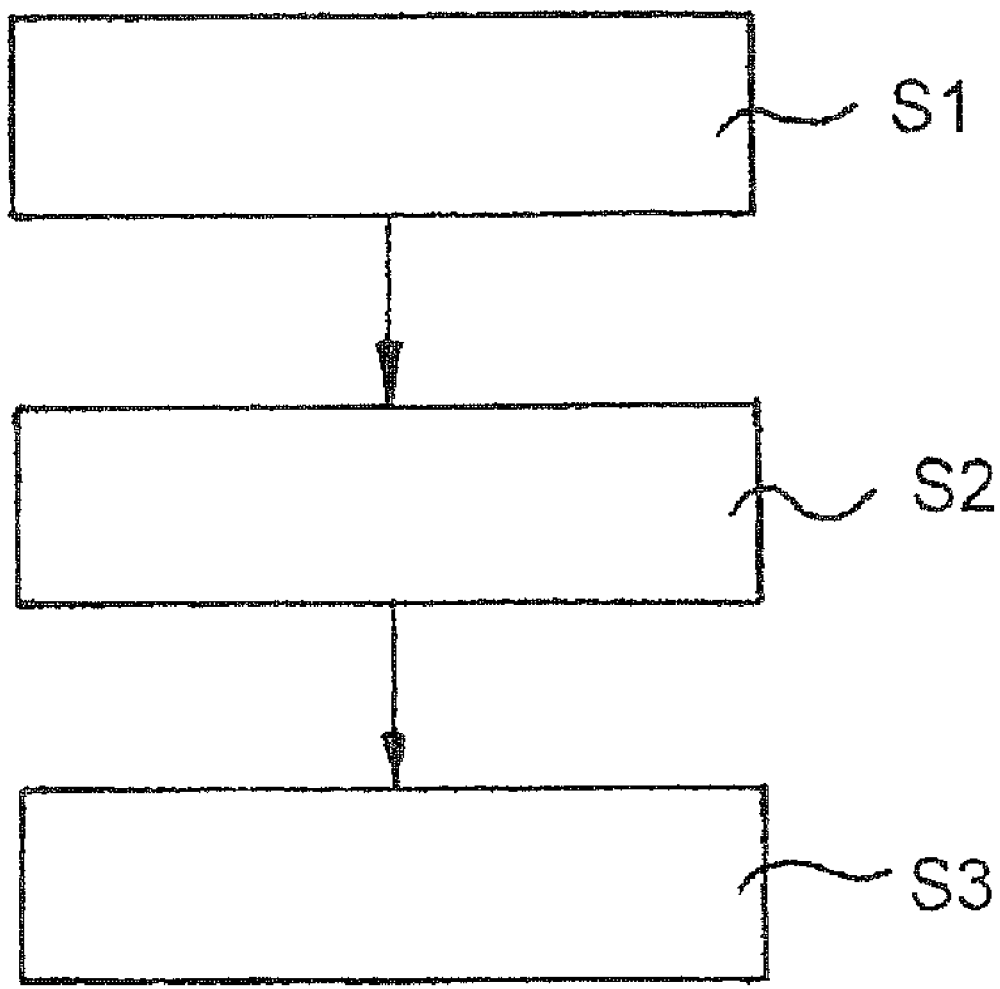
FIG. 3 is a flow chart illustrating fundamental steps of a method of making the optical strain gauge according to the exemplified embodiment.

FIG. 3 is a flow chart illustrating fundamental steps of a method of making the optical strain gauge according to the exemplified embodiment. In step S1, the glass core 5 with the Bragg grating 2 is provided. In step S2, the coating 6 is applied onto the glass core 5. Together, the steps S1 and S2 constitute a step of providing the glass fiber 1. In step S3, the sheath 3 is extruded onto the glass fiber 1.

Step S1, in which the glass core 5 with the Bragg grating 2 is provided, can comprise a step of providing the glass core 5 and a step of furnishing the glass core 5 with the Bragg grating 2.

With the method of making the optical strain gauge according to the exemplified embodiment, the parameters of extrusion can be chosen so that, after termination of the processes, a pressure of the sheath 3 on the glass fiber 1 is such that essentially no relative movement between the glass fiber 1 and the sheath 3 can occur, and it is possible to measure a strain precisely. The pressure of the sheath 3 on the glass fiber 1 can be between 120 N/mm$^2$ and 216 N/mm$^2$, for example.

The invention claimed is:

1. Optical strain gauge comprising a glass fiber, which is provided with a Bragg grating, and a sheath, wherein
   the sheath comprises the following composition: a mixture of poly-ether ether ketone and an inorganic filler in an admixture of at least 10 percent by weight and maximum 40 percent by weight, with a particle size of 0.08 µm to 12 µm,
   the outside diameter of the sheath is 0.2 mm to 1.2 mm,
   the ratio D/d between the outside diameter D of the sheath and the diameter d of the glass fiber is 2 to 6, and
   a pressure of the sheath on the glass fiber is such that no relative movement between the glass fiber and the sheath can occur.

2. Optical strain gauge according to claim 1, wherein the pressure of the sheath on the glass fiber is at least 120 N/mm$^2$.

3. Optical strain gauge according to claim 1, wherein the glass fiber comprises a glass core having a coating of ORMOCER□.

4. Optical strain gauge according to claim 1, wherein the inorganic filler is a silicate.

5. Optical strain gauge according to claim 1, wherein the inorganic filler is a laminated silicate.

6. Optical strain gauge according to claim 1, wherein the inorganic filler is talcum, chalk, calcium carbonate, barium sulfate, boron nitride, silicon dioxide or bentonite.

7. Optical strain gauge according to claim 1, wherein the admixture of the inorganic filler is at least 25 percent by weight and maximum 40 percent by weight.

8. Optical strain gauge according to claim 1, wherein the admixture of the inorganic filler is at least 27 percent by weight and maximum 33 percent by weight.

9. Optical strain gauge according to claim 1, wherein the particle size is at least 0.1 µm and maximum 10 µm.

10. Method of making an optical strain, which comprises the following steps:
    providing (S1, S2) of a glass fiber with a Bragg grating and extruding (S3) of a sheath onto the glass fiber, wherein
    the sheath comprises the following composition: a mixture of poly-ether ether ketone and an inorganic filler in an admixture of at least 10 percent by weight and maximum 40 percent by weight, with a particle size of 0.08 µm to 12 µm,
    the outside diameter of the sheath is 0.2 mm to 1.2 mm, the ratio D/d between the outside diameter D of the sheath and the diameter d of the glass fiber is 2 to 6, and
    after termination of the process, a pressure of the sheath on the glass fiber is such that no relative movement between the glass fiber and the sheath can occur.

11. Method according to claim 10, wherein parameters of extrusion are chosen so that, after termination of the process, the pressure of the sheath on the glass fiber is at least 120 N/mm$^2$.

12. Method according to claim 10, wherein the step of providing a glass fiber comprises the step (S1) of providing a glass core having the Bragg grating and the step (S2) of applying a coating of ORMOCER□ onto the glass core.

13. Method according to claim 10, wherein the inorganic filler is a silicate.

14. Method according to claim 10, wherein the inorganic filler is a laminated silicate.

15. Method according to claim 10, wherein the inorganic filler is talcum, chalk, calcium carbonate, barium sulfate, boron nitride, silicon dioxide or bentonite.

* * * * *